United States Patent [19]

Mauleon et al.

[11] Patent Number: 4,883,583
[45] Date of Patent: Nov. 28, 1989

[54] PROCESS FOR THE CATALYTIC CRACKING OF HYDROCARBONS IN A FLUIDIZED BED AND THEIR APPLICATIONS

[75] Inventors: Jean-Louis Mauléon, Marly-le-Roy; Jean-Bernard Sigaud, Vaucresson, both of France

[73] Assignee: Compagnie de Raffinage et de Distribution Total France, Paris, France

[21] Appl. No.: 229,810

[22] Filed: Aug. 8, 1988

Related U.S. Application Data

[63] Continuation of Ser. No. 885,911, Jul. 15, 1986, abandoned.

[30] Foreign Application Priority Data

Jul. 16, 1985 [FR] France .................................. 85 10891

[51] Int. Cl.⁴ .............................................. C10G 35/04
[52] U.S. Cl. .................................... 208/113; 208/157; 208/161; 422/140
[58] Field of Search .............. 208/157, 164, 113, 153, 208/161; 422/140, 141

[56] References Cited

U.S. PATENT DOCUMENTS

| | | | |
|---|---|---|---|
| 2,786,742 | 3/1957 | Makinley et al. | 422/140 |
| 2,952,619 | 9/1960 | Metrailer et al. | 208/157 |
| 3,152,065 | 10/1964 | Sharp et al. | 422/140 X |
| 3,617,497 | 11/1971 | Bryson et al. | 208/157 |
| 3,799,868 | 3/1974 | Gantt | 208/161 X |
| 4,097,243 | 6/1978 | Bartnolic | 208/153 X |
| 4,411,773 | 10/1983 | Gross | 208/164 |
| 4,427,537 | 1/1984 | Dean et al. | 208/120 |
| 4,434,049 | 2/1984 | Dean et al. | 208/153 |
| 4,578,183 | 3/1986 | Chou et al. | 208/157 X |

FOREIGN PATENT DOCUMENTS 0073396 9/1983 European Pat. Off.
0151882 8/1985 European Pat. Off.

*Primary Examiner*—Glenn Caldarola
*Attorney, Agent, or Firm*—A. Thomas S. Safford

[57] ABSTRACT

A process is disclosed for the catalytic cracking of hydrocarbons in a fluidized bed wherein the catalyst particles are injected in a fully fluidized suspension into an elongate reaction zone. In accordance with the process, the feedstock to be cracked is injected in a state of small droplets less than 200 microns in diameter countercurrently to the flow of the fully fluidized suspension of catalyst particles.

10 Claims, 2 Drawing Sheets

PROCESS FOR THE CATALYTIC CRACKING OF HYDROCARBONS IN A FLUIDIZED BED AND THEIR APPLICATIONS

This application is a continuation of application Ser. No. 885,911, filed July 15, 1986, abandoned.

FIELD OF THE INVENTION

The present invention relates to an improved process for catalytic cracking in a fluidized bed. More particularly, it relates to the catalytic cracking of a hydrocarbon feedstock injected into the catalytic cracking zone.

BACKGROUND OF THE INVENTION

As is known, the petroleum industry routinely uses cracking processes in which hydrocarbon molecules of high molecular weight and a high boiling point are broken down into smaller molecules boiling in lower temperature ranges suitable for the desired use.

The process which today is used most widely for this purpose is the so-called fluid catalytic cracking (FCC) process. In this type of process, the hydrocarbon feedstock is vaporized by being contacted at high temperature with a cracking catalyst that is kept in suspension in the feedstock vapors. After the desired molecular-weight range reduction has been attained by cracking, with a corresponding lowering of the boiling points, the catalyst is separated from the products obtained, stripped, regenerated by combustion of the coke formed, and again contacted with the feedstock to be cracked.

In processes of this type, the desired lowering of the boiling points is the result of controlled catalytic and thermal reactions, the FCC process being of course carried out so that the cracking unit is in thermal balance. In other words, the feed of hot regenerated catalyst should be such that it is able to meet the various thermal requirements of the reactor section, and more particularly:
Preheating of the liquid feedstock.
Vaporization of the feedstock.
Heat input required by the reactions involved, which overall are endothermic.

The latest developments in the area of catalytic cracking have shown that important factors in the cracking reaction are the rapidity and uniformity with which the feedstock is contacted with the catalyst particles, and hence the quality of the atomization and vaporization of the feedstock upon its injection into the reaction zone. (See U.S. application Ser. No. 827,333 filed Feb. 7, 1986, incorporated herein by reference.)

The feedstocks to be cracked are usually injected into the reaction zone at a temperature which generally ranges from 80° to 400° C. and a relative pressure of from 0.7 to 3.5 bar, while the temperature of the regenerated catalyst fed to that zone may be of the order of 600° to 950° C.

More particularly, when feedstocks composed of hydrocarbons having a high boiling point and containing asphaltenes are being processed, the catalyst is preferably injected into the reaction zone as a fully fluidized suspension at a temperature which may be as high as 950° C., a portion of the quantity of heat so supplied permitting at first the instantaneous thermal cracking of the heaviest and most unstable molecules into lighter molecules. The whole of the feedstock molecules and catalyst particles having by then reached an equilibrium temperature, the catalytic cracking reaction proceeds by contact of these molecules with the active sites of the catalyst.

It has been found that the heavier the hydrocarbon feedstock is, the more critical the configuration of the zone of injection of the feedstock into the catalytic cracking reactor becomes. It should permit optimum contact, that is, uniform and instantaneous contact, of the hydrocarbons with the catalyst. Moreover, practically complete atomization of any unvaporized product should take place as rapidly and as close to the injection zone as possible.

In the most advanced catalytic cracking units now in existence, the atomized hydrocarbon feedstock is injected cocurrently into a stream of catalyst particles circulating in an elongate reaction zone, generally called an elevator or "riser" when the feedstock flows from bottom to top, or a "dropper" when it flows from top to bottom. Regardless of the quality of the atomization of the feedstock, however, the largest droplets are entrained by the catalyst stream and necessarily travel some distance into the reaction zone. The greater that distance, the more the catalyst stream entraining a droplet falls short of carrying the heat necessary for vaporization of that droplet. As a result, the hydrocarbons contained in the largest droplets undergo excessive coking if the droplets collide with catalyst particles, or, if they do not, are converted to a lesser degree into lighter products.

SUMMARY OF THE INVENTION

The present invention therefore provides an improved fluid catalytic cracking process which overcomes the above drawbacks and in which the starting feedstock can be vaporized almost instantaneously by atomization of the liquid into droplets less than 200 microns, and preferably less than 100 microns, in diameter, and in which the stream of droplets so formed is injected countercurrently to the stream of catalyst particles.

To this end, the invention has as an embodiment a process for the catalytic cracking of hydrocarbons in a fluidized bed wherein the catalyst particles are injected in a dilute fluidized phase into an elongate reaction zone, characterized in that the feedstock to be cracked is injected in the state of fine droplets less than 200 microns in diameter countercurrently to the flow of the fully fluidized suspension of the catalyst particles.

The invention has as a further embodiment an apparatus for the catalytic cracking of hydrocarbons in a fluidized bed, comprising an elongate reaction zone into which the catalyst particles are injected in a fluidized phase, characterized in that it comprises means for the injection and atomization of the feedstock to be cracked countercurrently to the stream of catalyst particles in a fully fluidized suspension at an angle of between 5 and 80 degrees relative to the axis of the reaction zone, these injection means being such that the diameter of the droplets of the atomized feedstock is less than 200 microns.

Still another embodiment of the invention is the application of said process and apparatus to the catalytic cracking of hydrocarbon feedstocks in a fluidized bed.

In accordance with the invention, the smallest droplets of the feedstock to be cracked are thus vaporized instantaneously and the vapors produced are entrained by the catalyst particles toward the reaction zone while the largest droplets are vaporized more slowly, though completely, since their initial countercurrent travel permits them to encounter only a stream of completely regenerated catalyst that is at a constant temperature which is close to the temperature of injection of the latter. The result is better homogeneity of the stream of catalyst and vapors in the reaction zone, and the duration of the contact between catalyst particles and feedstock vapors becomes substantially constant since at the level of the injector of the feedstock the latter has been completely vaporized by now.

BRIEF DESCRIPTION OF THE DRAWINGS

The characteristics and advantages of the invention will now be described in greater detail with reference to the accompanying drawings, wherein.

DETAILED DESCRIPTION OF PREFERRED EMBODIMENTS

Figure 1:
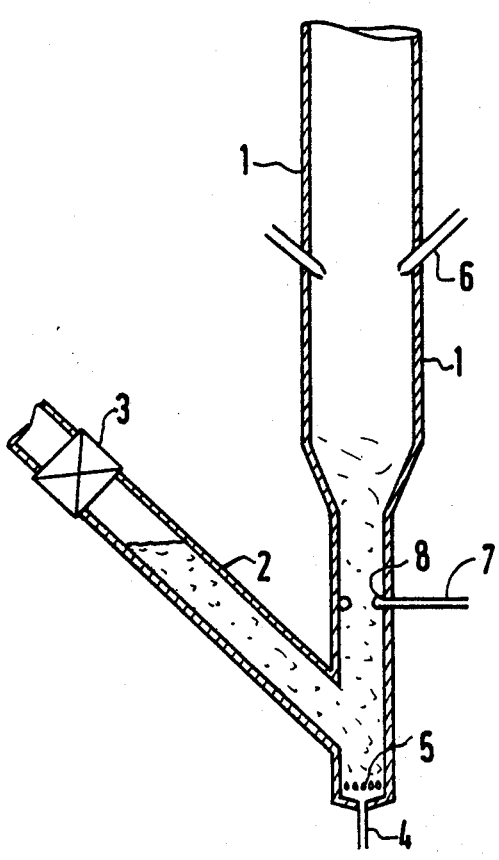
FIG. 1 is a diagrammatic view of an apparatus in accordance with the invention.

In the apparatus illustrated in FIG. 1, the regenerated catalyst is introduced at the base of a reactor 1 of the riser type through a line 2 in a quantity determined by the opening or closing of a valve 3. It is then made into a dense fluidized phase by the injection through a first diffuser 5 of a first gaseous fluid fed in through a line 4. The catalyst is then maintained in a homogeneous fluidized suspension in the reaction zone by the injection of a second gaseous fluid into the riser by means of a second diffuser 8, supplied through a line 7 and located in the upper portion of the dense catalyst bed.

Figure 2:
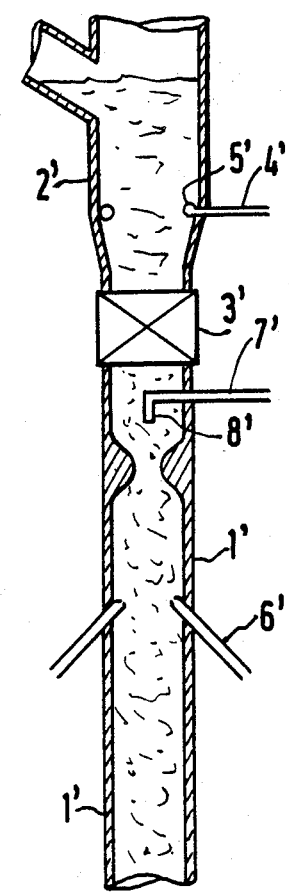
FIG. 2 is a similar view of a variant of said apparatus.

The feedstock to be cracked is introduced through a line 6 by means of an appropriate device of a type which is known per se and injected countercurrently to the ascending catalyst stream. To this end, the injectors are placed, in an appropriate number, at a downward angle relative to the riser ranging from 5 to 80 degrees, and preferably from 30 to 60 degrees. As a variant, FIG. 2 shows another catalytic cracking apparatus in accordance with the present invention wherein the reactor 1 is of the downflow or dropper type. In this figure, the elements already described in connection with FIG. 1 are designated by the same reference numerals, primed. Since the catalyst stream flows from top to bottom. the injectors 6' here make an upward angle with the dropper ranging from 5 to 80 degrees, and preferably from 30 to 60 degrees.

A first advantage of the apparatuses of the present invention stems from the fact that the largest droplets of the feedstock to be cracked are vaporized much more rapidly than in conventional injection systems since all along their path they are in the presence of a stream whose temperature is the temperature of injection of the completely regenerated catalyst particles. As a result, the risk of coking through direct collision with the catalyst particles is considerably reduced and the feedstock is completely vaporized at the level of injection, the rate of conversion of the hydrocarbon vapors in the reaction zone thus being increased.

A second advantage of the apparatuses in accordance with the present invention arises from the fact that since there is less coking due to collision with the catalyst particles, the latter preserve their activity for the subsequent catalytic cracking reaction, and this improves their selectivity for products obtained in the catalytic reaction.

A third advantage of these apparatuses is that they permit better contacting of the catalyst particles with the feedstock vapors. Practically instantaneous heat transfer thus ensues and the cracking reaction sets in immediately, at the requisite temperature, with completely regenerated catalyst which has not been deactivated by contact with the lightest fractions of the feedstock. All of the molecules of the feedstock are thus subjected to the catalytic reaction for the same length of time, which is a function of the length of the reaction zone. This makes it possible to obtain a better conversion rate as well as a better octane number of the gasoline produced. Finally, it also becomes possible to substantially reduce the residence time of the feedstock in the reaction zone, that is, to reduce the length of the riser. Such reduction results in a decrease in the pressure drop in the reactor that permits the size of the unit to be reduced;

in minimization of the deleterious effects of the heavy metals contained in the feedstock, which have less time to be reduced and thus are partially passivated; and in a reduction of the cost of construction of the cracking apparatus.

A further advantage of the apparatus of the invention is that it lends itself to the catalytic cracking of feedstocks containing much larger amounts of heavy products, and particularly asphaltenes. The contacting of a homogeneous stream of very hot catalyst particles with the finely atomized feedstock of heavy oils, which is injected countercurrently, makes possible an instantaneous thermal cracking reaction in which the heaviest molecules are broken down into smaller molecules without excessive coking of the catalyst particles. The latter, having thus retained most of their activity, then permit the catalytic cracking reactions of the smaller molecules so formed to proceed in the riser. The conversion rate of the cracking unit thus is considerably improved and the quantities to be recycled are reduced.

Still another advantage of the apparatus in accordance with the invention stems from the fact that the reduction of the amount of coke formed as the feedstock is contacted with the catalyst facilitates the regeneration of the catalyst by reducing the retention time in the regenerator or regenerators and by reducing the likelihood of hot spots developing therein, which would be detrimental to both the catalyst and the cracking unit.

In accordance with a special characteristic of the process and injection apparatus of the present invention, the hydrocarbon feedstock to be cracked may be introduced in the liquid state by means of at least one atomization device in such a way that the jet of atomized feedstock enters the reaction zone countercurrently to the stream of catalyst particles and at an angle ranging from 5 to 80 degrees, and preferably from 30 to 60 degrees.

The atomization devices needed to atomize the feedstock to droplets less than 200 microns, and preferably less than 100 microns, in diameter are of a type well known to those skilled in the art. Reference is made, by way of example but not of limitation, to French patent application No. 84 04 281, filed on Mar. 20, 1984, by the assignee, and incorporated herein.

To provide for uniform distribution of the atomized feedstock in the reaction zone, it is deemed preferable to use a plurality of injectors spaced along the periphery of the reactor.

The atomized feedstock, injected countercurrently into the reaction zone, should be introduced at a velocity ranging from 10 to 600 meters per second, and preferably from 50 to 200 meters per second. To accomplish this, atomization and countercurrent injection are advantageously carried out with the aid of an auxiliary fluid, which may be steam or a gaseous fluid relatively rich in hydrogen or in hydrogen compounds coming from another unit of the refinery.

The quantity of auxiliary fluid required advantageously ranges from 0.5 to 20 percent by weight, based on the feedstock to be cracked.

Finally, the temperature of the feedstock to be cracked may range from 70° to 400° C. upon its introduction into the reaction zone.

The stream of catalyst particles into which the feedstock is injected countercurrently is necessarily a homogeneous suspension of catalyst in a fully fluidized suspension, that is, having a density which generally is between 15 and 700 kg/m$^3$. The linear velocity of this suspension advantageously ranges from 0.01 to 10 meters per second. The devices for bringing about this fully fluidized suspension are of a type with which those skilled in the art are familiar. For injection into a riser, however, a device of the type described in U.S. application Ser. No. 827,333 filed on Feb. 7, 1986, incorporated herein by reference, is advantageously used.

This suspension of catalyst particles is advantageously produced with the aid of an auxiliary fluid, which may be composed of hydrocarbons having five or fewer carbon atoms, or of mixtures of such hydrocarbons. The stream may have a hydrogen concentration of up to 35 percent by volume, while the amount of steam injected may represent as much as 10 weight percent, based on the feedstock.

The suspension of catalyst particles is introduced at a temperature ranging from 550° to 750° C. when the feedstock to be cracked is of the conventional type, for example, a gas-oil feedstock. However, with so-called heavy feedstocks, that is, feedstocks containing more than 25 percent by volume hydrocarbon compounds boiling above 350° C., the temperature advantageously ranges from 650° to 950° C. to assure complete vaporization of the heaviest molecules as well as selective thermal cracking therof in the zone of injection into the reactor.

The equilibrium temperature resulting from the mixing of the catalyst stream with the atomized feedstock, injected countercurrently in accordance with the present invention, will be adjusted by the choice of an appropriate temperature for the injected feedstock, or by any other means, to permit the subsequent catalytic reaction to proceed under optimum temperature conditions, generally from 450° to 550° C., as the case may be.

A high temperature of the catalyst stream may be advantageously allowed by the use of a dual regeneration system of a type which is known per se.

Finally, the catalysts suitable for use in the apparatuses which are embodiments of the present invention include the cracking catalysts of the crystalline aluminosilicate type and certain silica-alumina, silica-magnesia or silica-zirconium types, all of which have relatively high cracking activity.

The crystalline aluminosilicates may be in the natural state or may be prepared synthetically, by processes well known to those skilled in the art. They may be selected from among the synthetic zeolites or the clays, such as faujasite, certain mordenites, montmorillonite, the bridged clays, the aluminophosphates or the like.

The example which follows will serve to illustrate the invention and therefore has no limitative character.

EXAMPLE

Two injection tests were conducted with an experimental setup representative of conditions of injection into a catalytic-cracking reaction zone.

In the first test, the atomized feedstock, formed of droplets less than 100 microns in diameter, was injected cocurrently into the catalyst stream (injector inclined 45 degrees relative to the axis of the reactor on the average), while in the second test the same feedstock was injected countercurrently.

| Operating conditions: | |
| --- | --- |
| Type of catalyst | Zeolite |
| Catalyst injection temperature | 815° C. |
| Density of fluidized phase | 320 kg/m$^3$ |
| Initial velocity of particles | 2 meters/second |
| Type of feedstock | Atmospheric residue of a heavy Arabian type of feedstock, hydrotreated |
| Temperature of feedstock | 120° C. |
| Diameter of droplets | 100 microns max. |
| Injection velocity of droplets | 150 meters/second |

Figure 3:
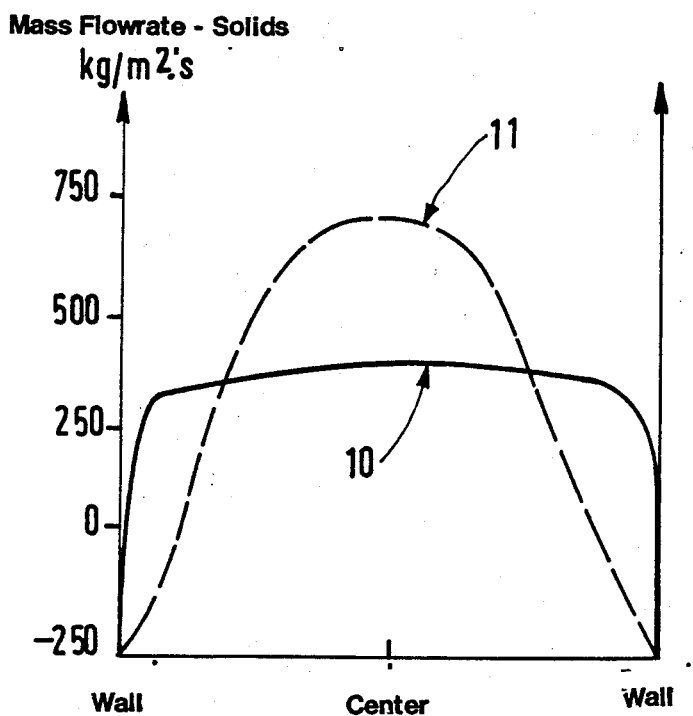
FIG. 3 shows curves which will be explained in connection with an exemplified embodiment of the invention.

FIG. 3 plots the mass flowrate of the suspension, expressed in kg/m$^2$.sec, at different points of the cross section of the reactor.

Examination of the curves of FIG. 3 shows that injection of the droplets countercurrently (solid curve 10) to the stream of catalyst particles permits homogenization of the mass flowrates in the injection zone, as compared to cocurrent injection of the droplets (dashed curve 11), which is feasible only thanks to practically instantaneous vaporization of the hydrocarbon feedstock.

What is claimed is:

1. A process for the catalytic cracking of a heavy hydrocarbon feedstock into lighter weight products in a fluidized bed, comprising the steps of:

injecting from an upstream position active catalyst particles in a fluidizing gas as a fully fluidized suspension, the fluidizing gas comprising hydrocarbons having five or fewer carbon atoms or mixtures thereof, the resulting dilute phase suspension having a density of from 15 to 700 kg/m$^3$ at a temperature above 550° C., into an elongate reaction zone, so that the fully fluidized catalyst suspension flows axially downstream through the reaction zone at a velocity of from 0.01 to 10 meters/second; and injecting the feedstock to be cracked as jets of atomized droplets less than 200 microns in diameter and at a temperature of from 70° to 400° C. into the elongate reaction zone at a velocity of from 10 to 600 meters/second, said jets originating from a plurality of positions spaced around the periphery of the reaction zone and downstream of the position of injection of said active catalyst, said jets of atomized feedstock being angled upstream at from 5 to 80 degrees relative to the axis of the reaction zone, so that the jets of atomized feedstock droplets enter the reaction zone in an upstream direction countercurrently to downstream flow of a fully established dilute phase fluidized suspension of active catalyst particles, wherein the atomized feedstock droplets are vaporized with the matter comprising the droplets being ultimately discharged downstream from said reaction zone.

2. A process according to claim 1, wherein said feedstock is a gas-oil; said fluidizing gas comprises hydrocarbons having five or fewer carbon atoms or mixtures thereof with from 0 to 35% by volume of $H_2$ and from 0 to 10% by weight of steam; the temperature of the fully established dilute phase fluidized suspension ranges from 550° to 750° C.; and the feedstock is injected at an angle relative to the elongate reaction zone of 30 to 60 degrees.

3. A process according to claim 2, wherein the feedstock is injected with a gaseous auxiliary fluid.

4. A process according to claim 1, wherein the feedstock is injected with a gaseous auxiliary fluid.

5. A process according to claim 1, wherein the feedstock is injected at an angle relative to the elongate reaction zone of 30 to 60 degrees.

6. A process according to claim 1, wherein at least 25 percent by volume of the hydrocarbon feedstock is composed of hydrocarbons having a boiling point above 350° C.

7. A process for the catalytic cracking of a heavy hydrocarbon feedstock into lighter weight products in a dilute fluidized bed, comprising the steps of:
   forming at an upstream position a downstream flow of a fully established dilute phase fluidized suspension of active catalyst particles in a fluidizing gas, said fluidizing gas being relatively lighter than said heavy hydrocarbon feedstock;
   flowing the resulting fully established dilute phase fluidized suspension downstream through an elongate reaction zone; and
   injecting atomized droplets of the feedstock to be cracked into the elongate reaction zone in an upstream direction in a manner such that said droplets are of less than about 200 microns in diameter and the the reaction zone countercurrently to the downstream flow of the fully established dilute phase fluidized suspension of active catalyst particles.

8. A process according to claim 7, wherein at least 25 percent by volume of the hydrocarbon feedstock is composed of hydrocarbons having a boiling point above 350° C., and said fluidizing gas further comprises hydrocarbons having five or fewer carbon atoms or mixtures thereof.

9. A process according to claim 8, wherein said fluidizing gas additionally comprises from 0 to 35% by volume of $H_2$ and from 0 to 10% by weight of steam, the feedstock is injected at an angle relative to the elongate reaction zone of 30 to 60 degrees, the feedstock is injected at a velocity of from 10 to 600 meters per second and at a temperature of from 70° to 400° C., and the temperature of the fully established dilute phase fluidized suspension ranges from 650° to 950° C.

10. A process according to claim 7, wherein said feedstock is a gas-oil, is injected at from 70° to 400° C. and at a velocity of 10 to 600 meters per second; said fluidizing gas comprises hydrocarbons having five or fewer carbon atoms or mixtures thereof with from 0 to 35% by volume of $H_2$ and from 0 to 10% by weight of steam; the temperature of the fully established dilute phase fluidized suspension ranges from 550° to 750° C.; and the feedstock is injected at an angle relative to the elongate reaction zone of 30 to 60 degrees.

* * * * *

UNITED STATES PATENT AND TRADEMARK OFFICE
CERTIFICATE OF CORRECTION

PATENT NO. : 4,883,583
DATED : Nov. 28, 1989
INVENTOR(S) : Mauléon, et al.

It is certified that error appears in the above-indentified patent and that said Letters Patent is hereby corrected as shown below:

```
     In claim 7. Col. 8, at the beginning of line 8,
please replace the first "the" by the word --enter--.
```

Signed and Sealed this

Thirteenth Day of August, 1996

Attest:

BRUCE LEHMAN

*Attesting Officer*     *Commissioner of Patents and Trademarks*